US012263983B2

(12) United States Patent
Bardini

(10) Patent No.: US 12,263,983 B2
(45) Date of Patent: Apr. 1, 2025

(54) CONTAINER LABELING MACHINE

(71) Applicant: P.E. LABELLERS S.P.A., Porto Mantovano (IT)

(72) Inventor: Riccardo Bardini, Torri del Benaco (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 123 days.

(21) Appl. No.: 18/024,834

(22) PCT Filed: Sep. 27, 2021

(86) PCT No.: PCT/EP2021/076523

§ 371 (c)(1),
(2) Date: Mar. 6, 2023

(87) PCT Pub. No.: WO2022/069415

PCT Pub. Date: Apr. 7, 2022

(65) Prior Publication Data

US 2023/0312156 A1 Oct. 5, 2023

(30) Foreign Application Priority Data

Sep. 29, 2020 (IT) ........................ 102020000022882

(51) Int. Cl.
*B65C 9/18* (2006.01)
*B65C 9/02* (2006.01)

(52) U.S. Cl.
CPC .............. *B65C 9/1826* (2013.01); *B65C 9/02* (2013.01); *B65C 2009/1838* (2013.01)

(58) Field of Classification Search
None
See application file for complete search history.

(56) References Cited

FOREIGN PATENT DOCUMENTS

| | | | |
|---|---|---|---|
| EP | 3446993 | A1 | 2/2019 |
| WO | 2015/173091 | A1 | 11/2015 |

OTHER PUBLICATIONS

European Patent Office (ISA/EP), International Search Report and Written Opinion of the International Searching Authority, 10 pages, Jan. 4, 2022.

*Primary Examiner* — Barbara J Musser
(74) *Attorney, Agent, or Firm* — THOMPSON HINE LLP

(57) ABSTRACT

A container labeling machine, including a conveyor of containers to be labeled and at least one labeling unit that comprises an unwinding assembly adapted to pick up from a spool a label ribbon to be applied to the containers, and to feed the label ribbon to a cutting drum which is provided with suction apertures for retaining the label ribbon in adhesion and provided with cutting apparatus for cutting the label ribbon at the separation region between two consecutive labels; the cutting drum supports at least one cutting device provided with a respective air suction chamber, which is open substantially at the lateral surface of the cutting drum and accommodates inside it at least one blade; the suction chamber is connectable to air suction apparatus for drawing the label ribbon against the blade, in order to cut the label ribbon.

10 Claims, 9 Drawing Sheets

CONTAINER LABELING MACHINE

The present invention relates to a container labeling machine and in particular to a labeling machine of the so-called "roll-fed" type.

As is known, machines for labeling containers in general, and bottles in particular, are widely used which have a conveyor for conveying the bottles along an advancement path which is constituted typically by a rotating carousel, provided peripherally with a plurality of supports for the individual bottles which are suitable to turn said bottles about their own axis.

Furthermore, labeling machines have, along the advancement path of the bottles, at least one labeling assembly provided with a transfer drum that allows to apply a respective label to each bottle that progressively appears in front of the transfer drum.

In particular, roll-fed labeling machines are known in which the labels are obtained by cutting a continuous label ribbon on which multiple labels are printed in succession and which is wound in a spool.

More particularly, labeling machines of this type are provided with an unwinding assembly which allows to take the label ribbon from the spool in order to feed it to a cutting drum, which allows to cut the label ribbon between one label and the other and to release the individual labels, once separated after cutting, to the transfer drum, which guides the labels to adhere to the respective bottles conveyed by the carousel.

It should be noted that the label ribbon can have strips of glue pre-applied to the face of the individual labels that is designed to make contact with the bottles or may have no glue and in this case a glue spreading roller faces the transfer drum laterally and applies, respectively at the leading and trailing edges of the labels, two strips of glue before the labels are transferred onto the bottles.

Traditional machines are typically structured so that the label ribbon is cut by interference, by making the label ribbon pass in a narrow interspace formed between two labels, one of which is movable and integrally fixed in rotation to the cutting drum, while the other one is stationary, is fixed to the supporting structure of the machine and faces the lateral surface of the cutting drum.

This embodiment entails, in traditional machines, the presence of specialized personnel, for the precise adjustment of the position of the fixed blade and of the one or more movable blades associated with the cutting drum, in order to ensure the presence of the correct interspace between the blades that cut the label ribbon.

Furthermore, this embodiment also requires the cutting drum, during its rotation, to perform a movement that is as regular and precise as possible.

For this purpose, typically, in known traditional machines the cutting drum is supported rotatably by a considerably large structure, known as support, which is provided as a single metal casting.

This structure usually has two bushing-shaped portions which are mutually axially spaced along the axis of the cutting drum and form respective rotation seats, in which the opposite ends of the supporting shaft of the cutting drum are coupled by virtue of preloaded oil-filled bearings, again in order to ensure the regularity of the rotary motion of the cutting drum.

The two bushing-shaped portions are in turn mutually connected by two elongated connecting arms which are mutually diametrically opposite with respect to the axis of the cutting drum, face the lateral surface of the cutting drum and are extended substantially parallel to the axis of the cutting drum.

The structure that supports the cutting drum also performs the important function of supporting rigidly, on one of the two elongated arms, the fixed blade by means of an adapted supporting body, which allows its adjustment in position with respect to the movable blade that is fixed to the cutting drum.

The need for such a support in traditional roll-fed machines entails a certain constructive complexity.

Furthermore, traditional roll-fed machines have considerable maintenance problems and considerable difficulty in blade replacement operations.

Another drawback that has been observed in traditional roll-fed machines arises from the structural complexity of the cutting drum structured in this manner and from its limited versatility, since it is provided with a fixed number of divisions and with a non-variable diameter, which limit the range of lengths of the labels that can be processed by the labeling machine.

The aim of the present invention is to provide a labeling machine that is capable of improving the background art in one or more of the aspects indicated above.

Within this aim, an object of the invention is to provide a labeling machine that is capable of ensuring the correct execution of the cutting of the label ribbon in any operating condition.

Another object of the invention is to provide a labeling machine that is capable of giving the greatest assurances of efficiency in the operation of the cutting drum.

Another object of the invention is to provide a labeling machine that allows easy replacement of the blades that cut the label ribbon even by non-specialized operators.

A further object of the invention is to provide a labeling machine that allows to increase the range of lengths of the labels that can be processed.

Another object of the present invention is to provide a solution that can be used also on existing roll-fed machines, so as to offer the possibility to easily perform a retrofit thereof.

A further object of the present invention is to overcome the drawbacks of the background art in a manner that is alternative to any existing solutions.

Not least object of the invention is to provide a labeling machine that is highly reliable and relatively easy to provide and can be manufactured at low costs.

This aim, as well as these and other objects which will become better apparent hereinafter, are achieved by a labeling machine according to claim 1, optionally provided with one or more of the characteristics of the dependent claims.

Further characteristics and advantages of the invention will become better apparent from the description of a preferred but not exclusive embodiment of the labeling machine according to the invention, illustrated by way of non-limiting example in the accompanying drawings, wherein.

Figure 1:
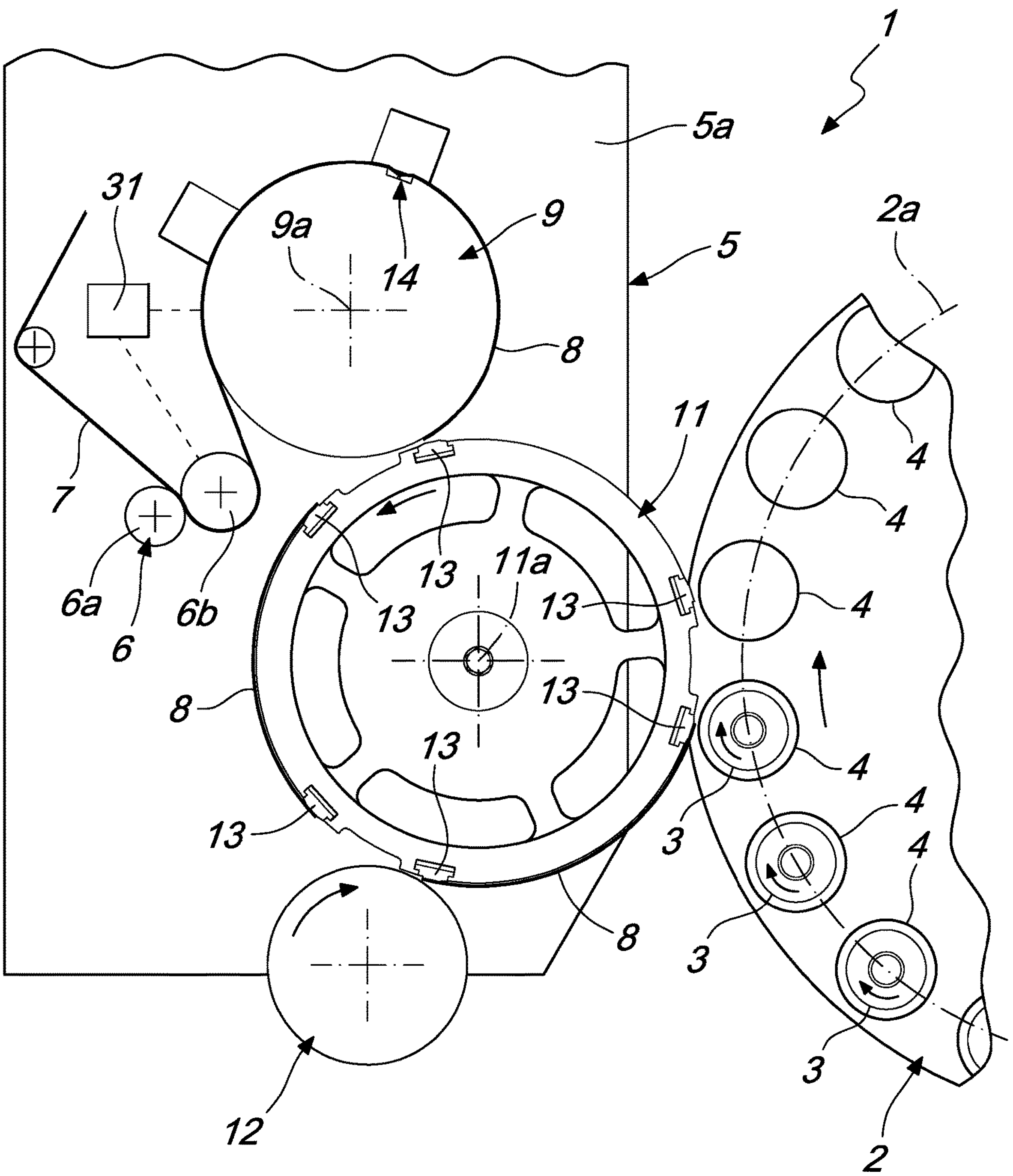
FIG. 1 is a schematic top plan view of the labeling machine according to the invention.
Figure 2:
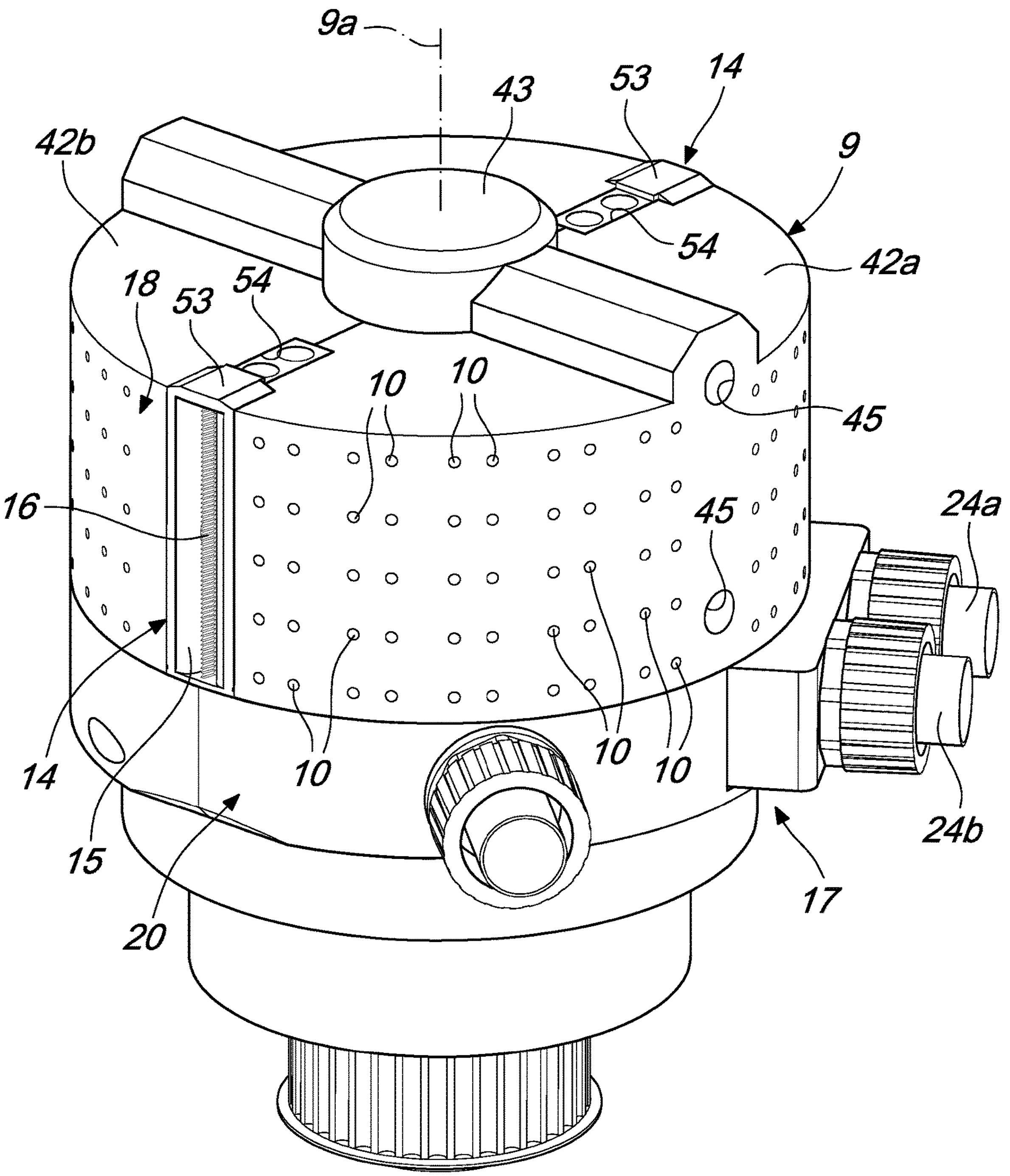
FIG. 2 is a perspective view of a cutting drum of the machine according to the invention.
Figure 3:
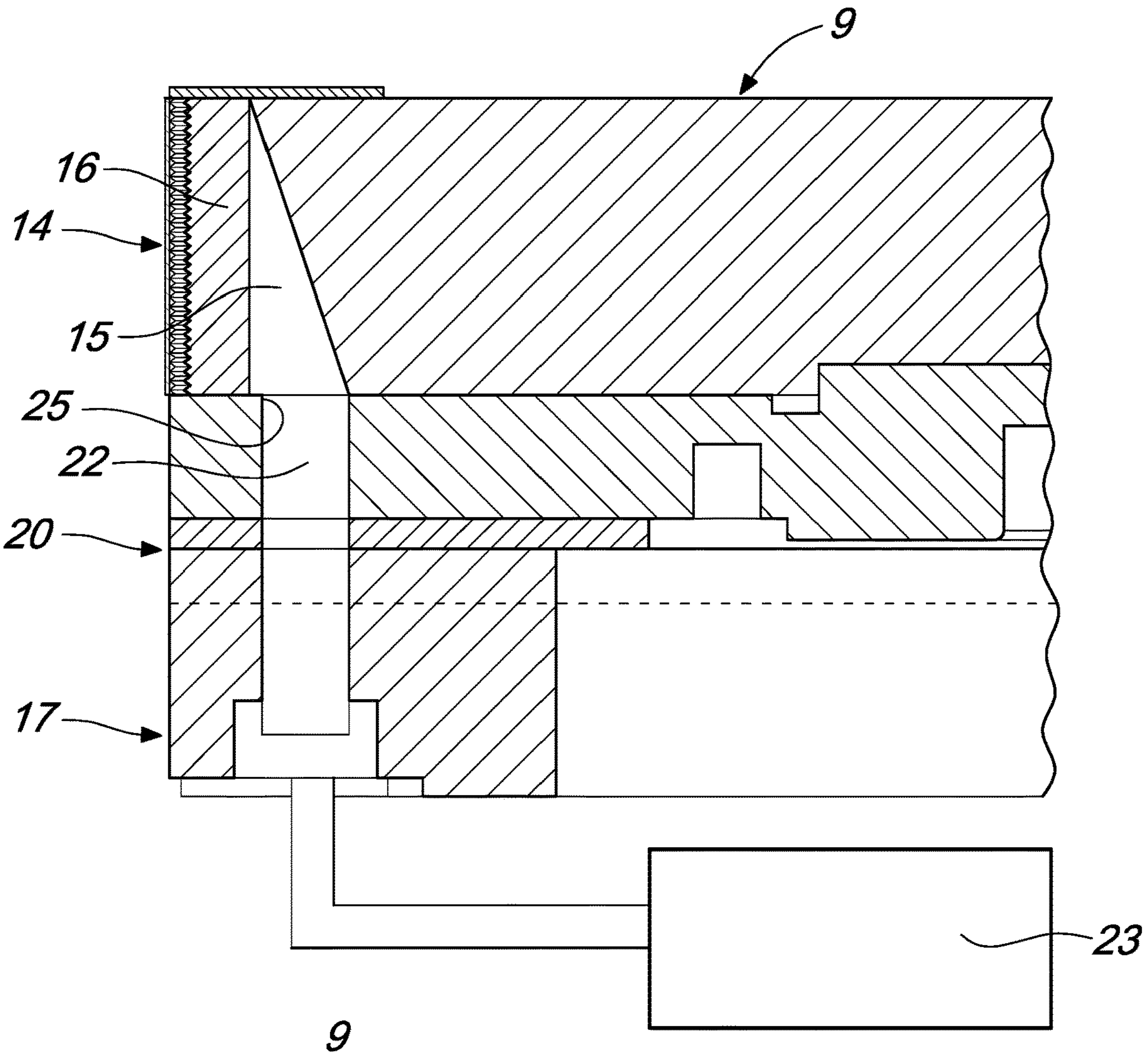
FIG. 3 is a schematic sectional view, taken along a diametrical plane, of the cutting drum of the machine according to the invention.

With reference to the figures, the labeling machine according to the invention, designated generally by the reference numeral 1, comprises a conveyor 2 of the containers 3 to be labeled along an advancement path 2*a*, which is conveniently constituted by a rotating carousel provided peripherally with plates 4 which can rotate and are designed to each support a respective container 3.

Along the advancement path 2*a* of the containers 3 there is at least one labeling unit 5, which comprises an unwinding assembly 6 which can be constituted for example by a pair of traction rollers 6*a*, 6*b* and is designed to pick up from a spool, not shown, a label ribbon 7 on which the labels 8 to be applied to the containers 3 are printed with continuity.

The unwinding assembly 6 feeds the label ribbon 7 to a cutting drum 9, which can rotate about its own axis 9*a* and is provided, on its lateral surface, with suction apertures 10 for retaining the label ribbon 7 in adhesion on its own lateral surface.

Furthermore, the cutting drum 9 is provided with cutting means which allow to cut the label ribbon 7 at the separation region between two consecutive labels 8 and is adapted to release the labels 8, obtained after cutting, to a transfer drum 11, which can rotate about its own axis 11*a*, which in turn is designed to transfer the individual labels 8, received from the cutting drum 9, into contact with a respective container 3 arriving from the conveyor 2.

Advantageously, the transfer drum 11 is divided circumferentially into sectors, each of which is designed to receive in adhesion a single label 8 that arrives from the cutting drum 9.

If the label ribbon 7 is not provided with pre-applied glue, laterally to the transfer drum 11 there is conveniently a glue roller 12, which is designed to apply at least one strip of glue to each end of the labels 8. For this purpose, at the regions of each one of the sectors of the transfer drum 11 on which the ends of labels 8 are designed to rest there are respective sliders 13, which are arranged in relief on the lateral surface of the transfer drum 11, with respect to the remaining part of the corresponding sector, so that upon that passage at the glue roller 12 the latter can apply a strip of glue to the labels 8.

According to the invention, the cutting drum 9 supports at least one cutting device 14, which has an air suction chamber 15, which is open substantially at the lateral surface of the cutting drum 9 and inside which at least one blade 16 is accommodated which is arranged conveniently so that its plane of arrangement is substantially parallel to a diametrical plane of the cutting drum 9.

In particular, the suction chamber 15 can be connected to air suction means 17, so as to generate a force that is capable of drawing the label ribbon 7 against the blade 16, thus cutting it, in order to obtain the labels 8.

Advantageously, the cutting drum 9 has, for each cutting device 14, at least one auxiliary region 18 for retaining the label ribbon 7 in contact with the cutting drum 9, which is provided with auxiliary suction holes 19 and is arranged directly before the corresponding cutting device 14 with respect to the direction of rotation of the cutting drum 9.

In particular, the auxiliary retention region 18 can be connected to the suction means 17, prior to the connection of the suction chamber 15 of the corresponding cutting device 14 to the suction means 17, in order to produce, in cooperation with the unwinding assembly 6, the tensioning of the label ribbon 7 before it is cut by the corresponding cutting device 14.

In this manner, by virtue of the auxiliary retention region 18, a greater force for drawing the label ribbon 7 toward the cutting drum 9 with respect to the portions thereof affected only by the suction apertures 10 and consequently a higher effectiveness of the cutting on the part of the blade 16 are ensured, even in conditions of less-than-perfect sharpening of said blade and especially at very high machine speeds.

More particularly, the suction means 17 conveniently comprise a fixed vacuum distribution unit 20 on which the cutting drum 9 is rotatably mounted and in which there is a cutting region 21, which has a vacuum chamber 22 connected to vacuum generation means 23, constituted for example by a vacuum pump or the like, conveniently by means of a first coupling connector 24*a*, and provided with a vacuum opening 25 which is formed in the face of the distribution unit 20 that is directed toward the cutting drum 9.

In the cutting region 21 of the distribution unit 20 there is furthermore an auxiliary vacuum chamber 26, which is also connected to the vacuum generation means 23, for example by means of a second coupling connector 24*b*, and is provided with an auxiliary vacuum opening 27, formed again on the face of the distribution unit 20 that is directed toward the cutting drum 9 and angularly spaced from the vacuum opening 25 with respect to the direction of rotation of the cutting drum 9.

In turn, the suction chamber 15 of each cutting device 14 has, on the face of the cutting drum 9 that is directed toward the distribution unit 20, at least one communication aperture 28, which is designed to face the vacuum opening 25 during the rotation of the cutting drum 9, so as to establish a connection between the suction chamber 15 and the vacuum generation means 23, while the auxiliary retention region 18 comprises an auxiliary suction chamber 29 which communicates with the auxiliary suction holes 19 and with an auxiliary communication aperture 30, which is also formed in the face of the cutting drum 9 that is directed toward the distribution unit and is designed, during the rotation of the cutting drum 9, to face at least partially the auxiliary vacuum opening 27, so as to establish a connection between the auxiliary vacuum chamber 29 and the vacuum generation means 23 and consequently activate the auxiliary retention region 18 before the communication aperture 28 of the suction chamber 15 of the corresponding cutting device 14 arrives at the vacuum opening 25 and therefore before the cutting device 14 cuts the label ribbon 7.

Advantageously, in order to ensure the correct tension of the label ribbon 7, there are automatic control means 31 which are constituted for example by an electronic controller, are functionally connected to the unwinding assembly 6 and are furthermore conveniently connected in input to a detector of the angular position of the cutting drum 9 with respect to the supporting structure 5*a* of the labeling unit 5.

Conveniently, the automatic control means 31 can be programmed to command the unwinding assembly 6 to perform a reduction of the speed with which the unwinding assembly 6 feeds the label ribbon 7 to the cutting drum 9 when the auxiliary communication aperture 30 reaches the auxiliary vacuum opening 27 during the rotation of the cutting drum 9, so that as a consequence of the slowing of the supply speed of the label ribbon 7 on the part of the unwinding assembly 6 and of the increased retention of the label ribbon 7 on the cutting drum 9, due to the activation of the auxiliary retention region 18, obtained by virtue of the connection of the auxiliary suction chamber 29 to the vacuum generation means 23, while the cutting drum 9 continues in its rotation, a tension of the portion of the label ribbon 7 comprised between the unwinding assembly 6 and the auxiliary retention region 18 is produced which is greater than the tension produced by the dynamic friction generated by the sliding of the cutting drum 9 on the label ribbon 7.

It should be noted that the auxiliary retention region 18 can be constituted by a block 32, which forms the auxiliary suction chamber 29 with the corresponding auxiliary communication opening 30 and, on an outer face thereof, the auxiliary suction holes 19 and is received, preferably detachably, by the cutting drum 9, at an accommodation groove 33, which is formed in the lateral surface of said cutting drum so that the outer face of the block 32 provided with the auxiliary suction holes 19 is flush with the lateral surface of the cutting drum 9.

Advantageously, the use of the block 32 to provide the auxiliary retention region 18 allows, by varying the material of which the block 32 is made, to provide the auxiliary retention region 18 with a friction coefficient, in relation to the label ribbon 7, that is different from the friction coefficient, again in relation to the label ribbon 7, of the material of which the remaining part of the cutting drum 9 is made.

Conveniently, the vacuum opening 25 and the auxiliary vacuum opening 27 both have a substantially slot-like shape.

In particular, the vacuum opening 25 is extended longitudinally along a direction that is substantially perpendicular to the rotation axis 9*a* of the cutting drum 9, while instead the auxiliary vacuum opening 27 is extended longitudinally along a circular arc around an axis that substantially coincides with the rotation axis 9*a* of the cutting drum 9.

Advantageously, the auxiliary vacuum opening 27 is located at a greater distance from the axis of rotation 9*a* of the cutting drum 9 with respect to the vacuum opening 25, so that the auxiliary communication aperture 30, which is at a distance from the rotation axis 9*a* of the cutting drum 9 that substantially corresponds to the distance of the auxiliary vacuum opening 27, does not pass in the region of the vacuum opening 25 during the rotation of the cutting drum 9.

Conveniently, the vacuum opening 25 and the communication aperture 28 have substantially the same shape and size, while the auxiliary communication aperture 30 can have the same transverse dimension and smaller dimensions in a longitudinal direction with respect to the auxiliary vacuum opening 27 and optionally a shape that can be different from that of the auxiliary vacuum opening 27, such as for example a circular shape.

Advantageously, the cutting region 21 is formed by at least one portion of the distribution unit 20 which is loaded elastically against the cutting drum 9, so as to obtain a greater adhesion between the cutting region 21 and the cutting drum and in order to optimize friction between the surfaces of the cutting drum 9 and of the distribution unit 20.

Figure 7:
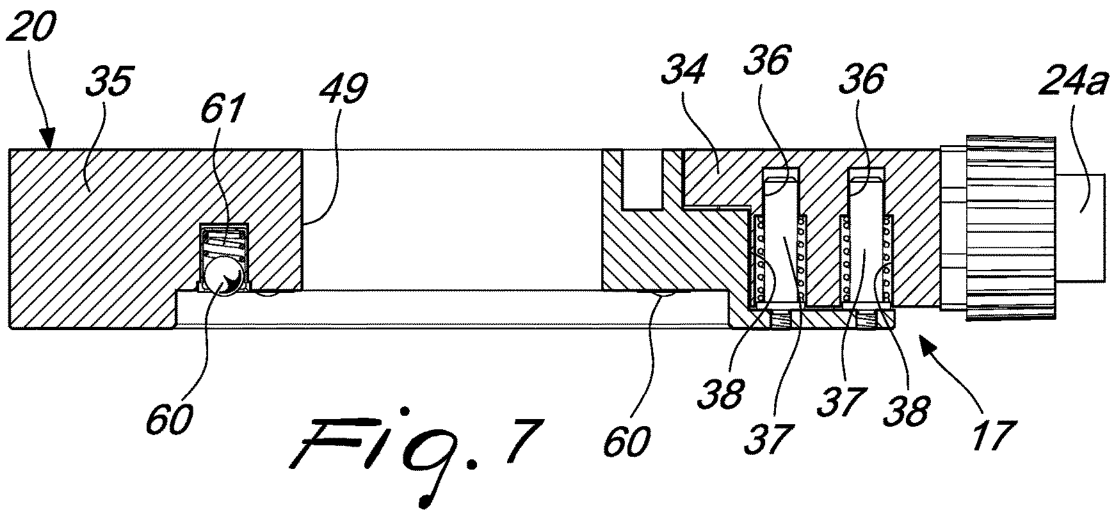
FIG. 7 is a sectional view, taken along the plane VII-VII of FIG. 6.
Figure 8:
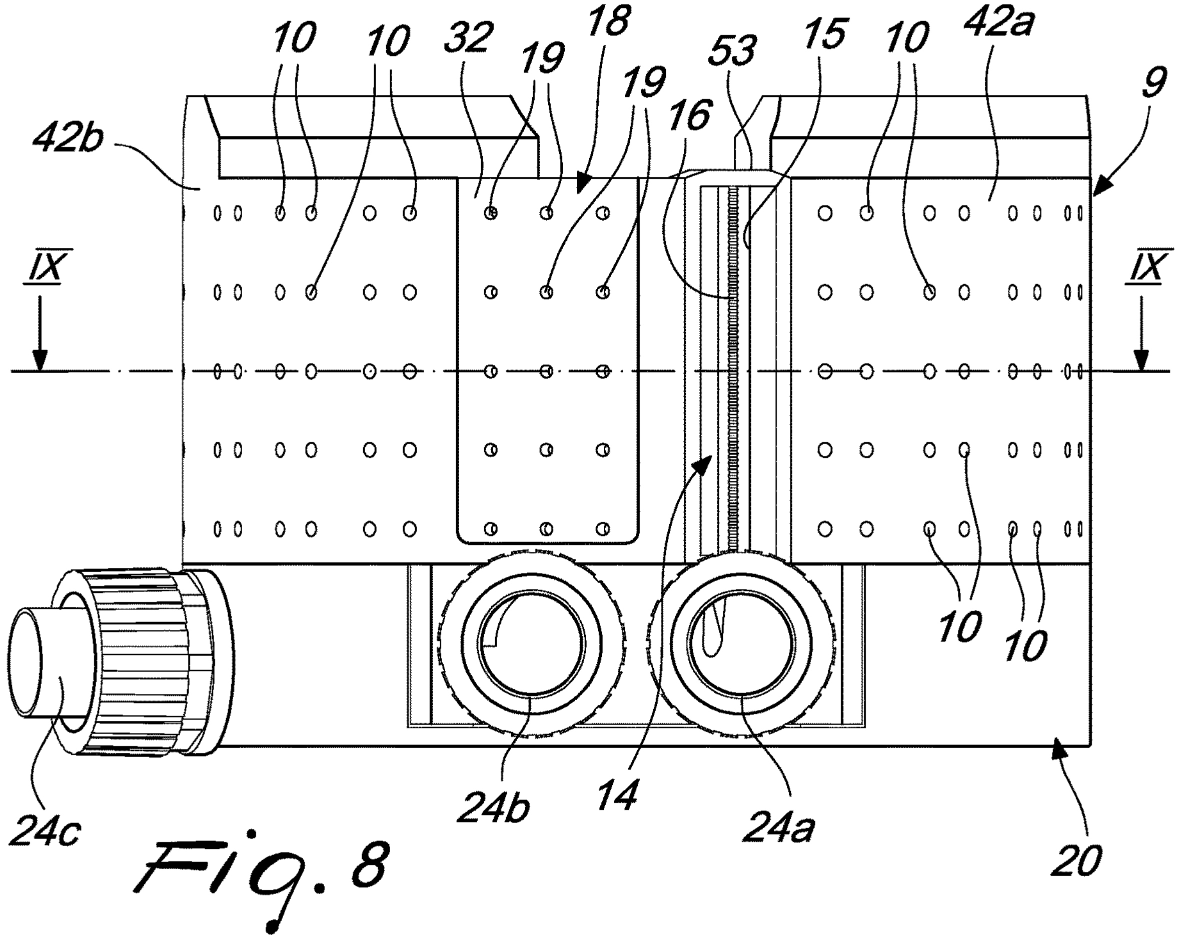
FIG. 8 is a front elevation view of the cutting drum of the machine according to the invention.
Figure 9:
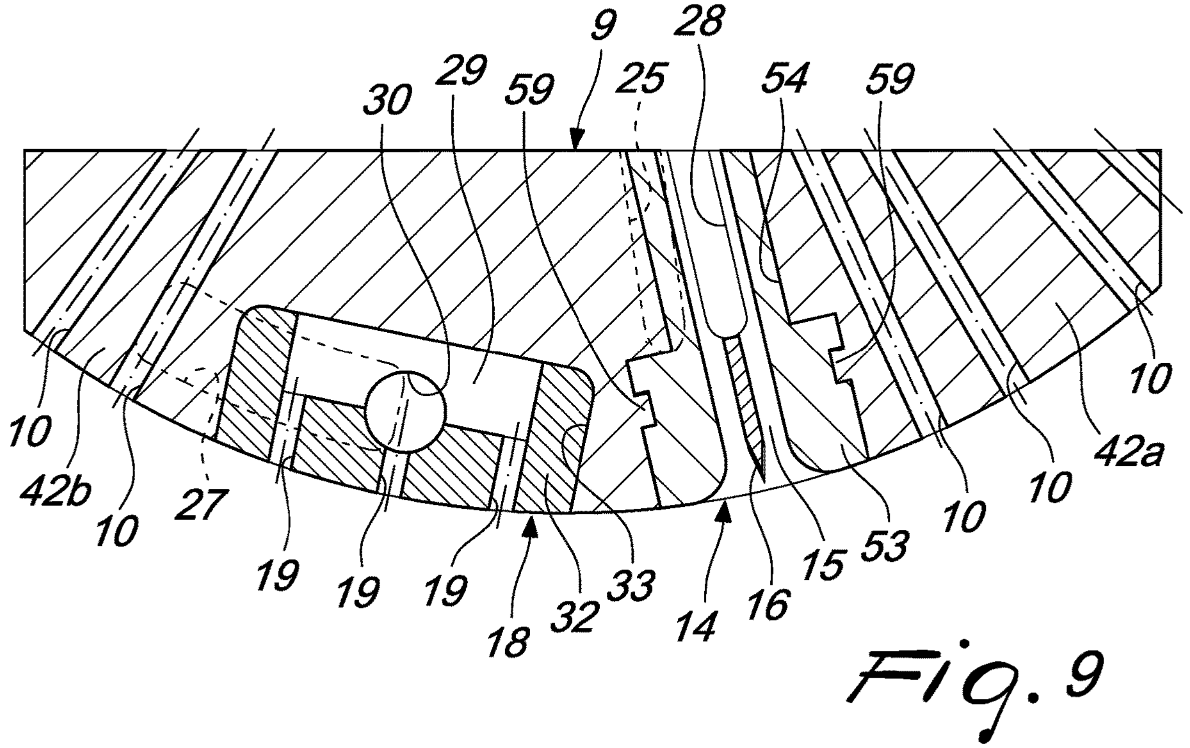
FIG. 9 is a partial sectional view of the cutting drum, taken along the plane IX-IX of FIG. 8.

In particular, as can be seen in FIG. 7, the cutting region 21 is provided in a separate body 34 with respect to the main body 35 of the distribution unit 20.

Conveniently, the separate body 34 is mounted so that it can slide with respect to the remaining part of the distribution unit 20 along a direction that is substantially parallel to the axis 9*a* of the cutting drum 9 and is kept pushed toward the cutting drum 9 by virtue of elastic means.

More particularly, the separate body 34 is provided with sliding engagement seats 36 for guiding pins 37, which are fixed to the main body 35 of the distribution unit 20 and around which pusher springs 38 are mounted which are interposed between the separate body 34 and the main body of the distribution unit 20.

Advantageously, the distribution unit 20 is supported, as a whole, by ball-type pressers 60, which are distributed around an axis that substantially coincides with the axis 9*a* of the cutting drum 9, act on the supporting structure 5*a* and, by virtue of corresponding helical springs 61, allow to keep the distribution unit 20 pushed against the cutting drum 9.

Conveniently, in the distribution unit 20 there is also at least one first retention slot 39*a*, which is extended through at least one circular arc around an axis that is substantially parallel to the rotation axis 9*a* of the cutting drum 9 and is connected, by means of a third coupling connector 24*c*, to the vacuum generation means 23 and communicates with the suction apertures 10 provided on the lateral surface of the cutting drum 9, in order to keep the label ribbon 7 and the labels 8, separated after cutting, in adhesion on the cutting drum 9.

Optionally, in the body of the distribution unit 20, outside the cutting region 21, there can be a second retention slot 39*b*, which is extended along a circular arc that has a larger diameter than the first retention slot 39*a*, is substantially aligned circumferentially with the auxiliary vacuum opening 27, and allows to establish a connection between the vacuum generation means 23 and the auxiliary suction holes 19 of the auxiliary retention region 18, so as to keep active the auxiliary retention region 18 even after the latter has moved beyond the cutting region 21 during the rotation of the cutting drum 9 about its own axis 9*a*.

Advantageously, again in the distribution unit 20, in a position that is angularly spaced from the cutting region 21 with respect to the rotation axis 9*a* of the cutting drum 9, there is a blow hole 40, which is connected to a pressurized air source, not shown, and is designed, during the rotation of the latter about its own axis 9*a*, to establish a connection with the suction apertures 10, so that they emit a jet of air in order to allow the passage of the labels 8 obtained after cutting on the transfer drum 11.

Advantageously, in order to facilitate the operations for setting up the machine in case of a change of the format of the labels 8 to be transferred onto the containers 3 and to give the possibility to provide a retrofit of existing roll-fed machines, providing them with a system for cutting the labels 8 that is different from the traditional cutting by interference, the cutting drum 9 can be provided by at least two shells 42*a* and 42*b* which are fixed around a rotational actuation shaft 43, which forms in practice, with its axis, the rotation axis 9*a* of the cutting drum 9.

In particular, the shells 42*a*, 42*b* are fixed to the actuation shaft 43 by virtue of detachable coupling means which extend substantially radially with respect to the axis of said actuation shaft.

Figure 10:
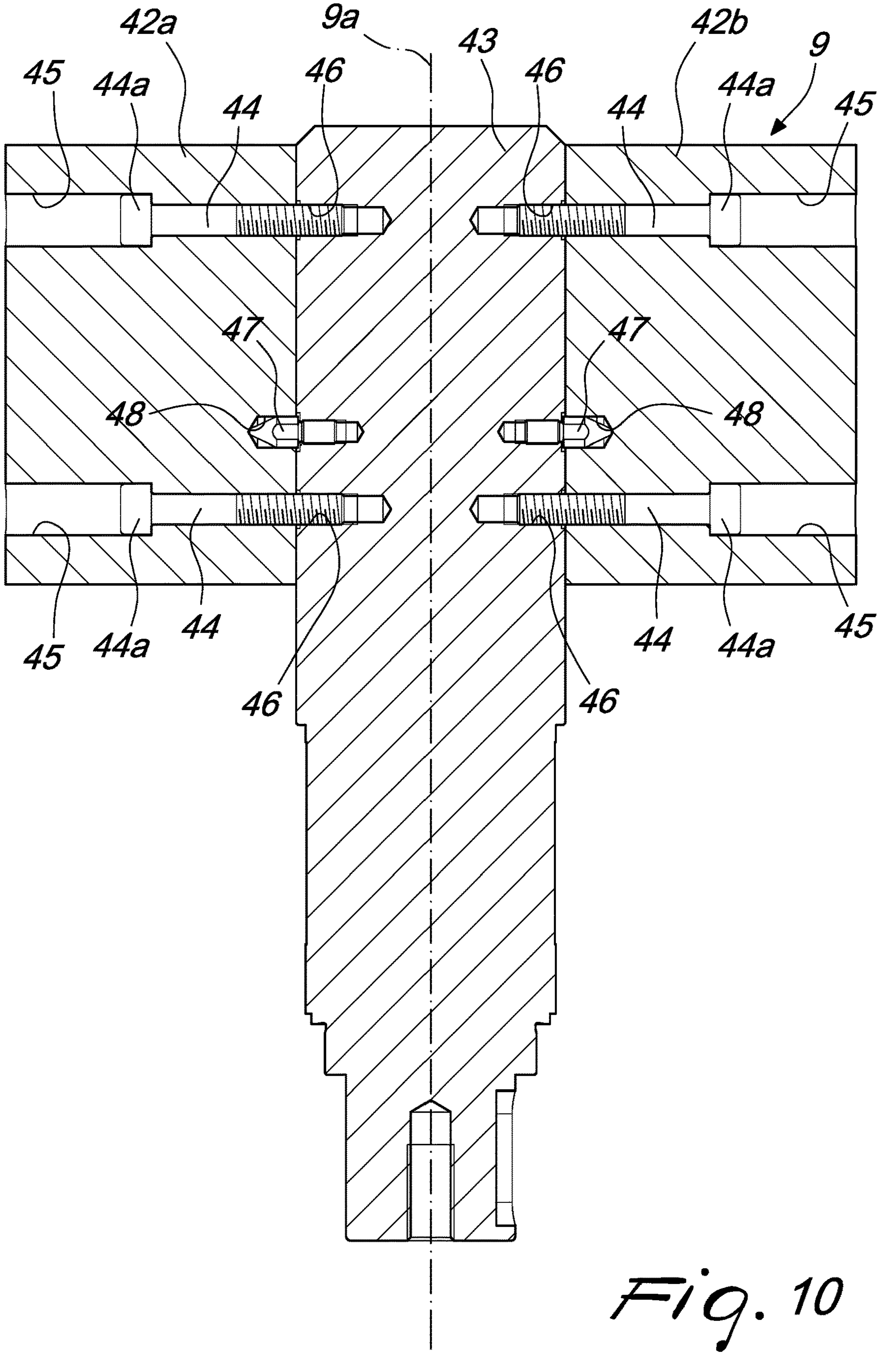
FIG. 10 is a sectional view of the cutting drum of the machine according to the invention, taken along a diametrical plane that is different with respect to FIG. 5 and with parts omitted for the sake of simplicity.
Figure 11:
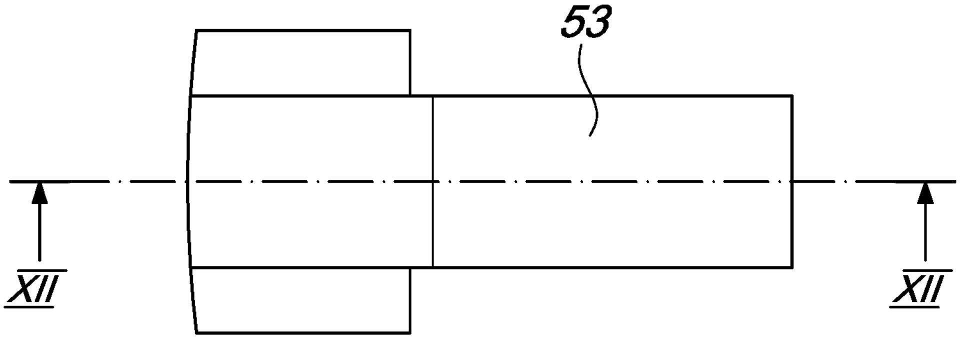
FIG. 11 is a top plan view of a box-like blade supporting body of a cutting device of the cutting drum of the machine according to the invention.
Figure 12:
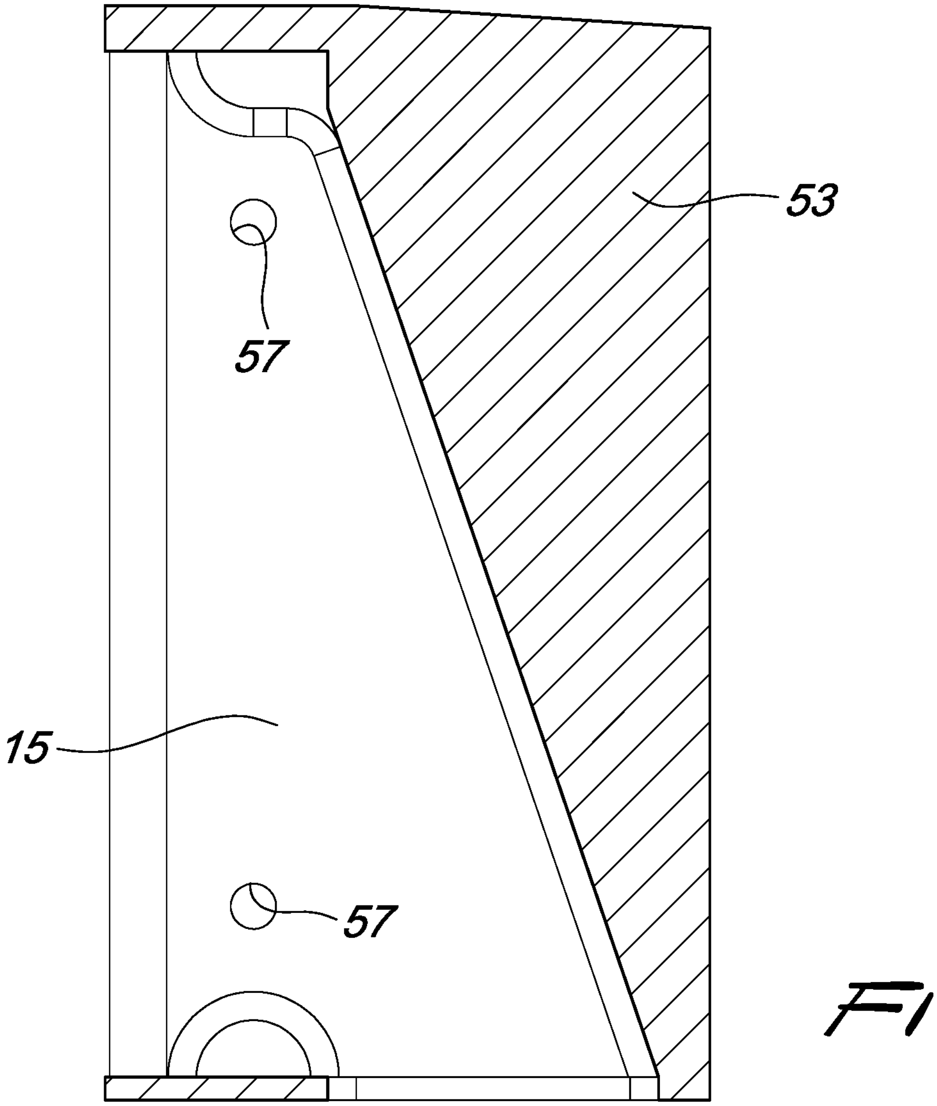
FIG. 12 is a sectional view, taken along the plane XII-XII of FIG. 11.
Figure 13:
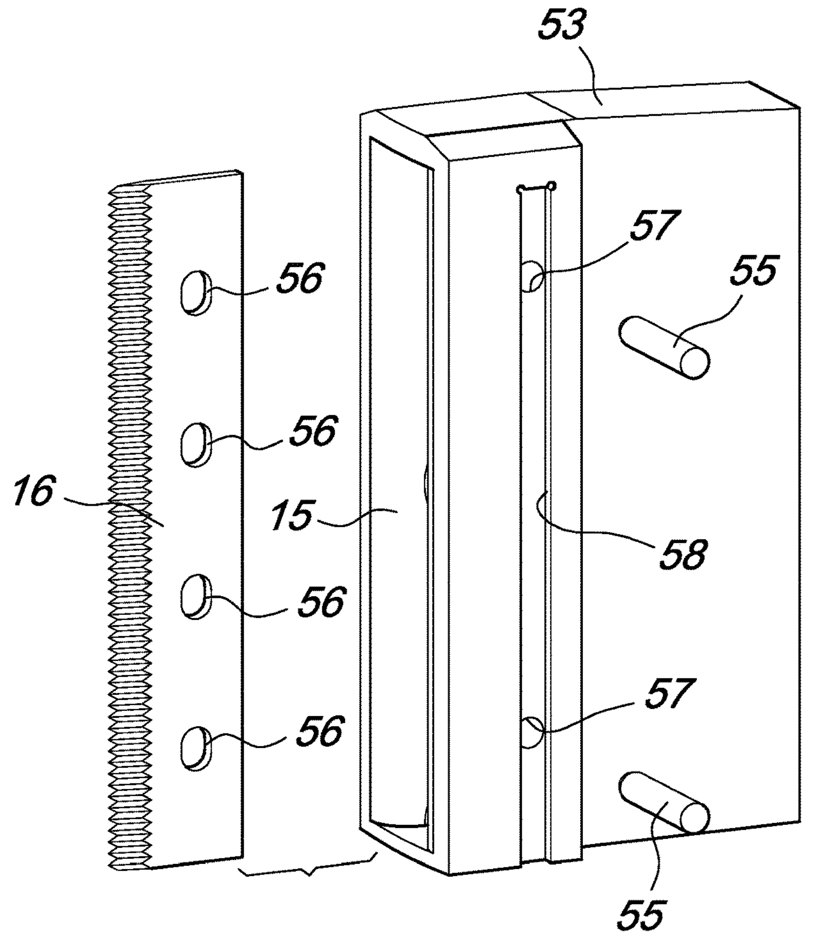
FIG. 13 is an exploded perspective view of the box-like blade supporting body.

As shown in FIG. 10, the detachable coupling means are advantageously constituted by screws 44 which are inserted in radial accommodation seats 45 formed in the shells 42*a* and 42*b*, have a cross-sectional variation in order to form an abutment region for the head 44*a* of the screws 44 and engage in a radial female threads 46 provided on the outer lateral surface of the actuation shaft 43.

Conveniently, the detachable coupling means furthermore comprise centering pins 47 which protrude radially from the actuation shaft 43 and are designed to engage abutment seats 48 formed in the shells 42*a* and 42*b*.

Figure 5:
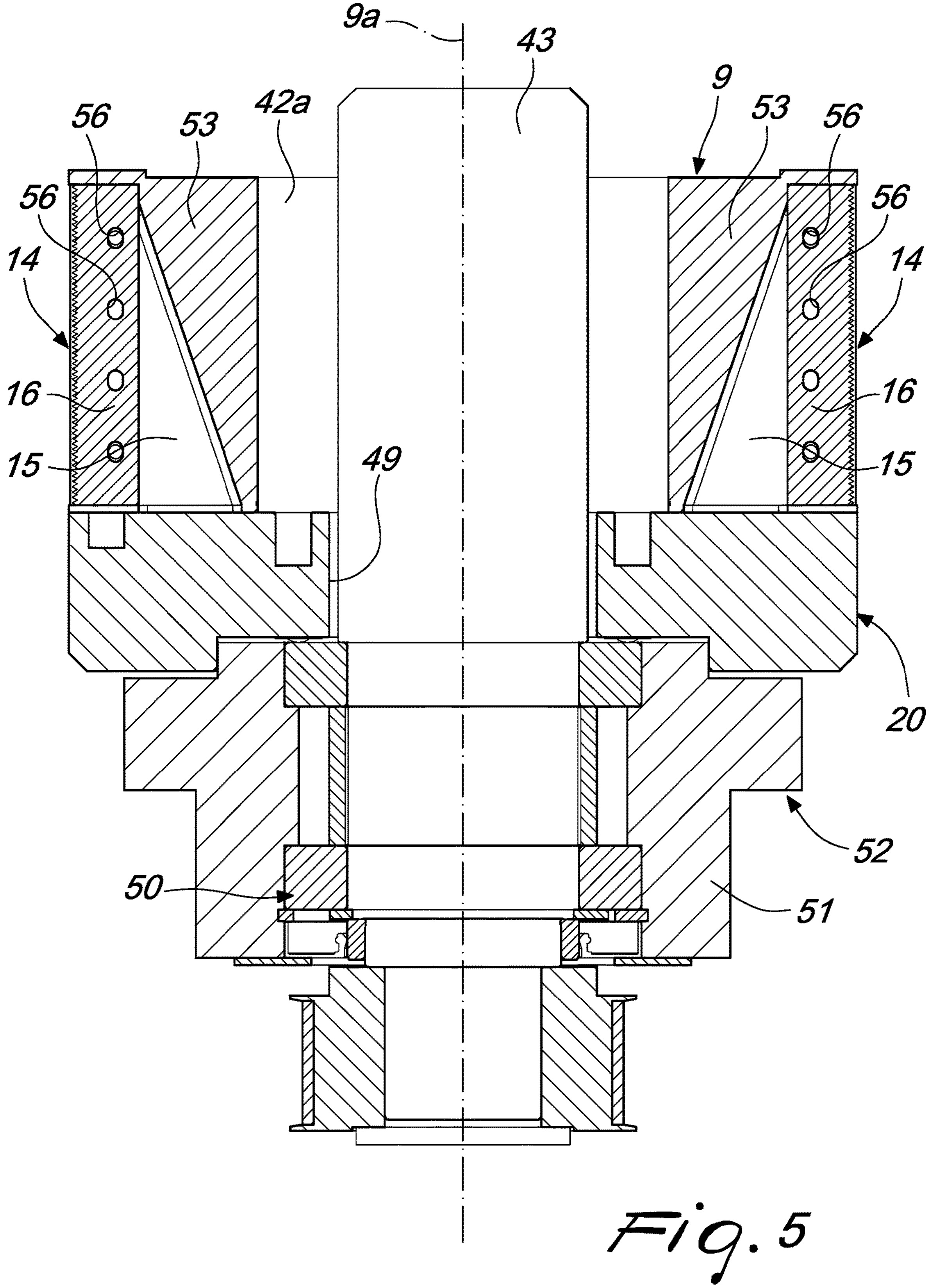
FIG. 5 is a sectional view, taken along a diametrical plane, of the cutting drum of the machine according to the invention.
Figure 6:
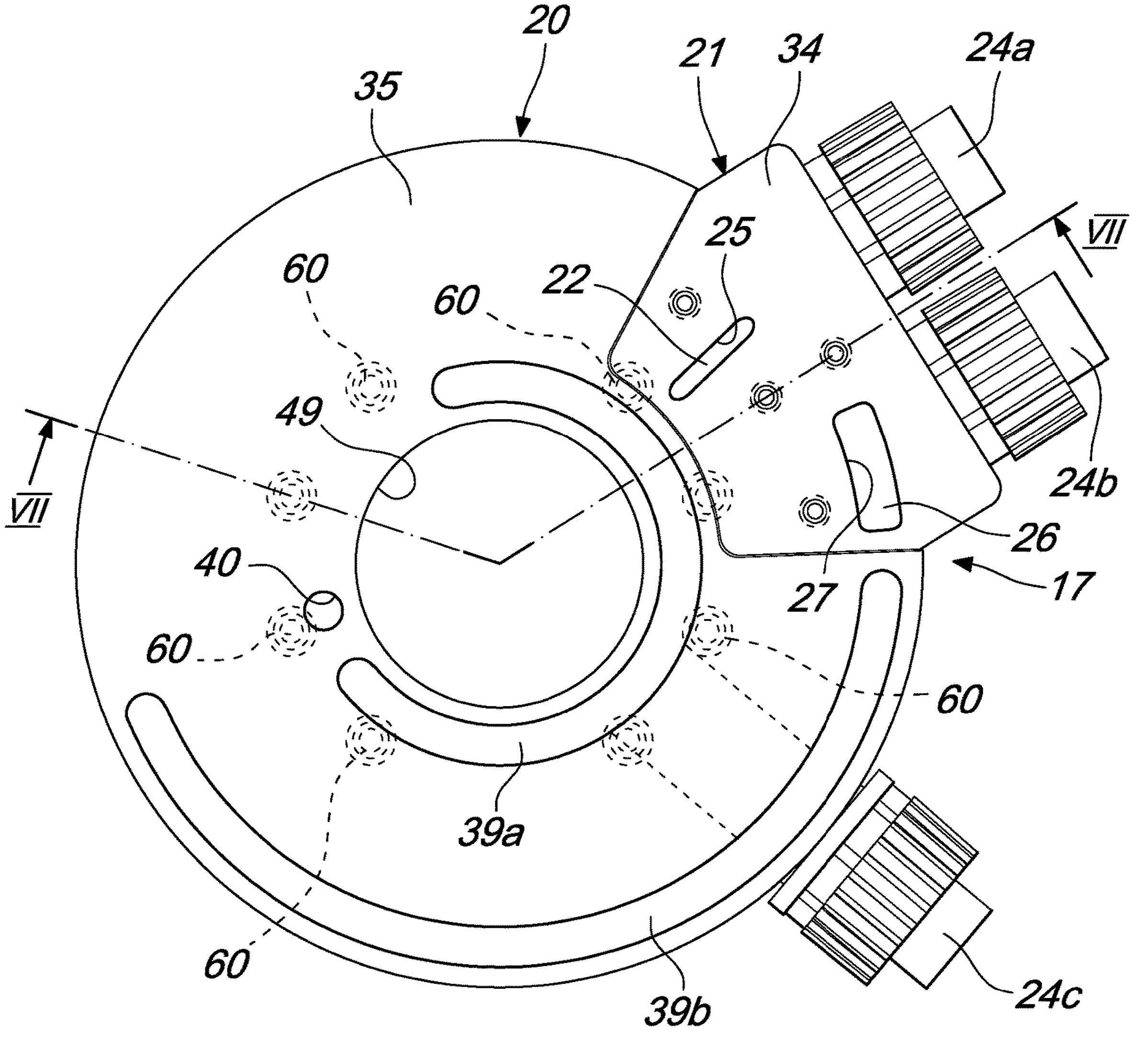
FIG. 6 is a top plan view of a vacuum distribution unit associated with the cutting drum of the machine according to the invention.

Advantageously, as can be seen in particular in FIG. 5, the actuation shaft 43 passes axially through a central passage 49 formed in the distribution unit 20 and is conveniently supported rotatably, advantageously by virtue of the interposition of bearings 50, by a bushing or collar element 51, which in turn is fixed to the supporting structure of the machine and, more particularly, to the supporting structure 5*a* of the labeling unit 5, by means of a flanged coupling 52.

This embodiment achieves a considerable simplification, with respect to the background art, of the parts of the machine designed to support the cutting drum 9 in addition to a simplification of their mounting on the fixed parts of the machine.

It should be noted, furthermore, that each cutting device 14 advantageously comprises a respective box-like blade supporting body 53, which defines the corresponding suction chamber 15 and is detachably accommodated in a corresponding accommodation seat 54 formed in the cutting drum 9.

Figure 4:
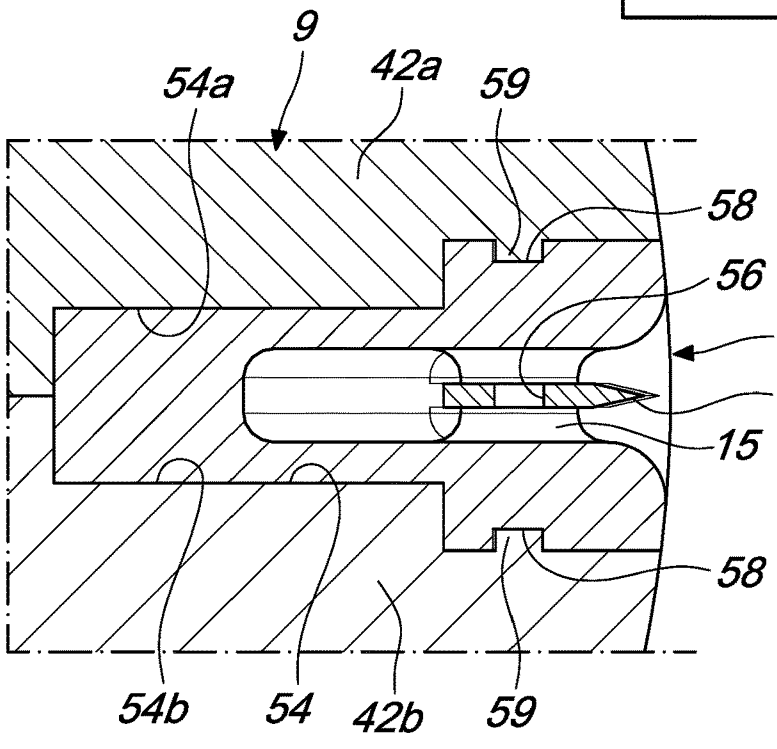
FIG. 4 is an enlarged-scale view of a detail of the cutting drum of the machine according to the invention, shown in cross-section along a plane that is perpendicular to the axis of the cutting drum.
Figure 14:
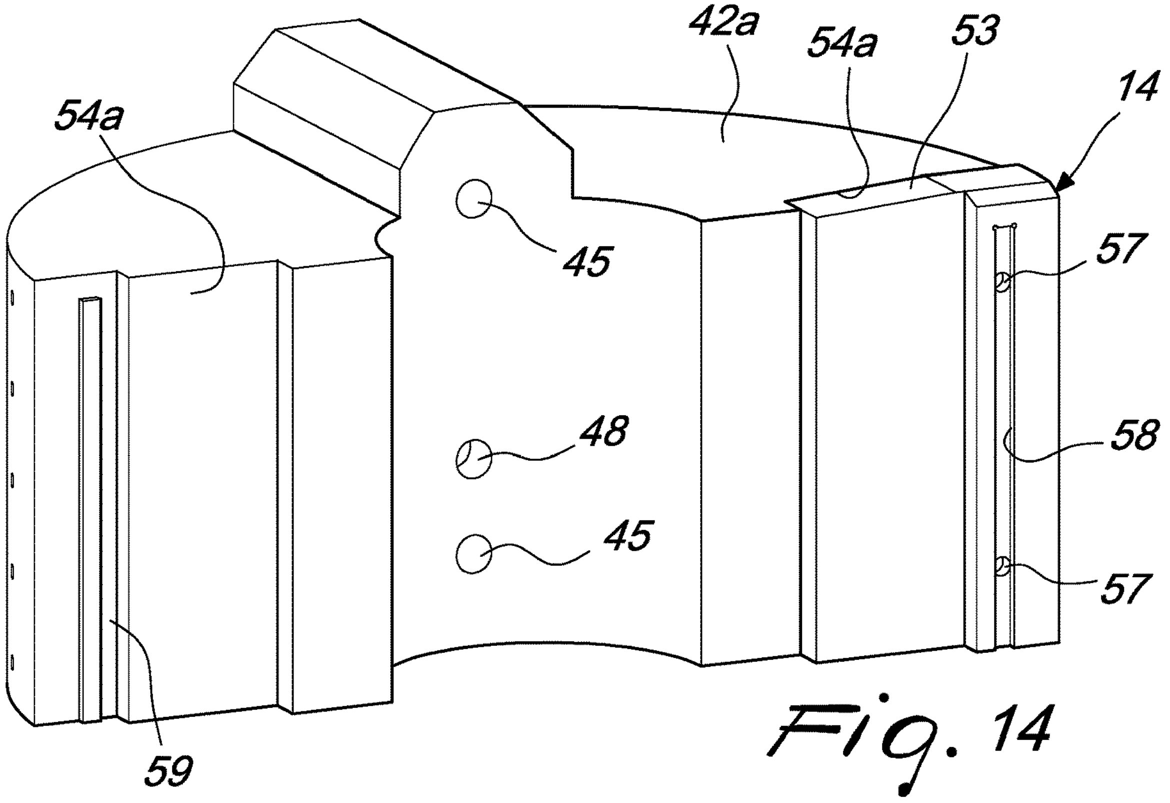
FIG. 14 is a perspective view of elements that compose the cutting drum of the machine according to the invention.

Conveniently, as shown in particular in FIG. 4 and in FIG. 14, respective portions 54*a*, 54*b* of the accommodation seats 54 of the box-like blade supporting body 53 of each cutting device 14 are formed in mutually facing regions of the shells 42*a*, 42*b*.

Advantageously, the blade 16 of each cutting device 14 is detachably fixed to the corresponding box-like blade supporting body 53 by means of retention pins 55 which are inserted through respective engagement openings 56, which are formed in the blade 16 and detachably engage corresponding supporting seats 57, which are formed in the box-like blade supporting body 53 and can be accessed from the outside of the box-like blade supporting body 53 in order to allow the extraction of the retention pins 55 from the supporting seats 57.

In this manner, once the box-like blade supporting body 53 has been uncoupled from the cutting drum 9 it is possible to remove the blade 16 from the box-like blade supporting body 53, after disengaging the retention pins 55 from the engagement openings 56 by virtue of their extraction from the supporting seats 57.

Conveniently, on the outer surface of the box-like blade supporting body 53 there are, on mutually opposite sides, longitudinal grooves 58 which are extended substantially parallel to the rotation axis 9*a* of the cutting drum 9 and can be engaged slidingly by respective ribs 59 formed in the internal walls by the accommodation seat 54 of the box-like blade supporting body 53 and, more particularly, at the mutually facing regions of the shells 42*a* and 42*b* in which the portions 54*a*, 54*b* of the accommodation seats 54 of the box-like blade supporting bodies 53 are formed.

In this manner, the engagement and disengagement of the box-like blade supporting bodies 53 from the corresponding accommodation seats 54 can occur by means of a relative sliding between the box-like blade supporting body 53 and the cutting drum 9, guided by the engagement of the ribs 59 along the grooves 58.

It should be noted that the grooves 58 are open at their end designed to be directed toward the distribution unit 20, while they are closed at the other end in order to block the relative sliding between the box-like blade supporting body 53 and the cutting drum 9 in the direction of the insertion of the box-like blade supporting body 53 in its own accommodation seat 54 when the box-like supporting body 53 reaches the correct position with respect to the cutting drum 9.

Advantageously, in order to keep the retention pins 55 in the respective supporting seats 57, when the box-like supporting body 53 is arranged in the corresponding accommodation seat 54 the openings for access from outside to the supporting seats 57 of the retention pins 55 are formed in the bottom of the grooves 58, so they can be closed by the ribs 59.

The operation of the container labeling machine according to the invention is as follows.

The unwinding assembly 6 picks up the label ribbon 7 from the corresponding spool and, as is usual in traditional roll-fed machines, feeds it to the cutting drum 9 at a preset feeding speed, which is lower than the peripheral speed of the cutting drum 9, in order to compensate for any difference in length that exists between the divisions of the cutting drum 9, formed by the space that is circumferentially present between the corresponding cutting devices, and the length of the labels 7.

Particularly if the machine is operated at high speeds, when, during the rotation of the cutting drum 9, the auxiliary communication aperture 30 of the auxiliary retention region 18 that directly precedes one of the cutting devices 14 arrives at the auxiliary vacuum opening 27, the auxiliary retention region 18 is activated, as a consequence of the connection of the auxiliary suction holes 19 to the vacuum generation means 23.

Meanwhile, while the communication aperture 28 of the suction chamber 15 of the cutting device 14 that corresponds to the auxiliary retention region 18 that has been activated approaches the vacuum opening 25, its blade 16 is arranged at the separation region between two consecutive labels 8.

At this point, the automatic control means 31 command the unwinding unit 6 to accelerate the feeding speed of the label ribbon 7 to the cutting drum 9 by means of an increase in the rotation rate of the traction rollers 6*a* and 6*b*, so as to bring the feeding speed of the label ribbon 7 to a value that is closer to that of the peripheral speed of the cutting drum 9.

At the same time, the communication aperture 28 of the suction chamber 15 of the cutting device 14 that corresponds to the auxiliary retention region 18 that has been activated arrives at the vacuum opening 25, thus establishing a connection between the vacuum chamber 15 and the vacuum generation means 23, so as to attract the label ribbon 7 into the suction chamber 15 and push it against the blade 16 in order to cut it.

At the same time, the automatic control means 31 command the unwinding assembly 6 to slow the feeding speed of the label ribbon 7 to the cutting drum 9, so that while the cutting drum 9 continues in its rotation about its own axis 9*a* at the same speed, with the label ribbon 7 retained at the auxiliary retention region 18, a tension of the portion of the label ribbon 7 that is comprised between the unwinding assembly 6 and the auxiliary retention region 18 is produced which allows to facilitate the execution of a clean and regular cut of the label ribbon 7 by the blade 16.

The automatic control means 31 then command the unwinding assembly to feed to the label ribbon to the cutting drum 9, returning the feeding speed of the label ribbon 7 to the cutting drum 9 to its initial value, thus resynchronizing the label ribbon 7 with the cutting drum 9, while the label 8 separated after cutting continues its motion while remaining in adhesion on the cutting drum 9.

As an alternative, nothing forbids, especially at low speeds, the feeding speed of the label ribbon 7 from being kept by the automatic control means 31, even during the cutting steps of the label ribbon 7, at a substantially constant value that is lower than the value of the peripheral speed of the cutting drum 9, as typically occurs also in traditional roll-fed machines.

When the portion of the cutting drum 9 in which the label 8 separated from the label ribbon 7 is located in adhesion arrives at the blow hole 40, the label 8 is released to the transfer drum 11, which transfers it first at the glue roller 12, so that two strips of glue are applied to the ends of the label 8, and then moves it to adhere to the corresponding container 3 conveyed by the conveyor 2.

In practice it has been found that the invention achieves the intended aim and objects and in particular the fact is stressed that the container labeling machine according to the invention allows to change very simply the number of divisions of the cutting drum depending on the format of the labels, something which is practically impossible to perform on traditional roll-fed machines.

Another advantage offered by the machine according to the invention with respect to traditional roll-fed machines is to be able to vary the diameter of the cutting drum to size, without having to perform structural modifications to the machine and without the need to resort to highly qualified operators.

The invention thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102020000022882 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A container labeling machine, comprising a conveyor of containers to be labeled along an advancement path and at least one labeling unit arranged along said advancement path of the containers, said at least one labeling unit comprising an unwinding assembly adapted to pick up from a spool a label ribbon, which has printed thereon with continuity labels to be applied to the containers, and to feed said label ribbon to a cutting drum which is provided, on a lateral surface thereof, with suction apertures for retaining said label ribbon in adhesion on the lateral surface of said cutting drum, and provided with at least one cutting device for cutting said label ribbon at a separation region between two consecutive of said labels, said cutting drum being adapted to release the labels obtained after cutting to a transfer drum assigned to transferring the individual labels so that said labels adhere to a respective container that is arriving from said conveyor, wherein said at least one cutting device is provided with a suction chamber for a suction of air which is open substantially at the lateral surface of said cutting drum and accommodates inside at least one blade, said suction chamber being connectable to air suction means for drawing said label ribbon against said blade, in order to cut said label ribbon;

wherein said cutting drum has, for each cutting device, at least one auxiliary region for retention of said label ribbon and which is provided with auxiliary suction holes;

wherein said air suction means comprise a fixed vacuum distribution unit on which said cutting drum is mounted rotatably, a cutting region being formed in said distribution unit and having a vacuum chamber which is connected to vacuum generation means and is provided with a vacuum opening, which is formed on a face of said distribution unit that is directed toward said cutting drum, and an auxiliary vacuum chamber which is connected to said vacuum generation means and is provided with an auxiliary vacuum opening, formed on the face of said distribution unit that is directed toward said cutting drum, said suction chamber having, on the face of said cutting drum that is directed toward said distribution unit, at least one communication aperture, which is designed to face said vacuum opening, during the rotation of said cutting drum, in order to establish a connection between said suction chamber and said vacuum generation means, said auxiliary retention region comprising an auxiliary suction chamber which communicates with said auxiliary suction holes and with an auxiliary communication aperture which is designed, during the rotation of said cutting drum, to face at least partially said auxiliary vacuum opening, before said communication aperture arrives at said vacuum opening.

2. The machine according to claim 1, wherein the at least one auxiliary region is arranged directly before a corresponding cutting device with respect to a direction of rotation of said cutting drum, said auxiliary retention region being connectable to said air suction means, before the connection of the suction chamber of the corresponding cutting device to said air suction means, in order to produce, in cooperation with said unwinding assembly, a tensioning of said label ribbon.

3. The machine according to claim 1, further comprising automatic control means which are functionally connected to said unwinding assembly and are adapted to command a reduction of the speed with which said unwinding assembly supplies said label ribbon to said cutting drum when said auxiliary communication aperture reaches said auxiliary vacuum opening during the rotation of said cutting drum.

4. The machine according to claim 1, wherein said vacuum opening is a slot and said auxiliary vacuum is a slot, said vacuum opening being extended along a direction that is substantially perpendicular to a rotation axis of said cutting drum, said auxiliary vacuum opening being extended along a circular arc around the rotation axis of said cutting drum.

5. The machine according to claim 4, wherein said auxiliary vacuum opening is arranged at a greater distance from the axis of rotation of said cutting drum than said vacuum opening.

6. The machine according to claim 1, wherein said cutting region is formed by at least one portion of said distribution unit which is loaded elastically against said cutting drum.

7. The machine according to claim 1, wherein said cutting drum comprises at least two shells, which are fixed around a rotational actuation shaft by virtue of detachable coupling means which are extended substantially radially with respect to an axis of said rotational actuation shaft.

8. The machine according to claim 7, wherein said actuation shaft is supported rotatably by a bushing element which is fixed to a supporting structure of the machine by means of a flanged coupling.

9. The machine according to claim 1, wherein each cutting device comprises a respective box like blade supporting body, which forms a corresponding said suction chamber and is accommodated detachably in a corresponding accommodation seat formed in said cutting drum.

10. The machine according to claim 9, wherein respective portions of the accommodation seat of the blade supporting body of each cutting device are formed in mutually facing regions of said shells.

* * * * *